US006981388B2

(12) United States Patent
Brutscher et al.

(10) Patent No.: US 6,981,388 B2
(45) Date of Patent: Jan. 3, 2006

(54) AIR CONDITIONING SYSTEM

(75) Inventors: Norbert Brutscher, Lindenberg (DE); Joachim Haas, Wangen (DE)

(73) Assignee: Liebherr-Aerospace Lindenberg GmbH, Lindenberg/Allgau (DE)

(*) Notice: Subject to any disclaimer, the term of this patent is extended or adjusted under 35 U.S.C. 154(b) by 29 days.

(21) Appl. No.: 10/345,005

(22) Filed: Jan. 15, 2003

(65) Prior Publication Data

US 2003/0177780 A1 Sep. 25, 2003

(30) Foreign Application Priority Data

Jan. 16, 2002 (DE) .......................... 102 01 426

(51) Int. Cl.
*F25D 9/00* (2006.01)

(52) U.S. Cl. ................... 62/401; 62/86; 62/87; 62/172; 62/402

(58) Field of Classification Search .............. 62/86, 62/87, 172, 401, 402, 510; 165/126, 140, 165/143, 144, 145
See application file for complete search history.

(56) References Cited

U.S. PATENT DOCUMENTS

| | | | |
|---|---|---|---|
| 5,323,624 A | * | 6/1994 | Schwalm .................. 62/401 |
| 5,511,385 A | | 4/1996 | Drew et al. |
| 5,704,218 A | | 1/1998 | Christians et al. |
| 6,128,909 A | * | 10/2000 | Jonqueres .................. 62/87 |
| 6,415,621 B2 | | 7/2002 | Buchholz et al. |

FOREIGN PATENT DOCUMENTS

| | | |
|---|---|---|
| DE | 19935918 | 2/2001 |
| DE | 10009373 | 9/2001 |
| EP | 0891279 | 1/1999 |
| EP | 940336 | 9/1999 |
| GB | 2355520 | 4/2001 |
| WO | 99/24318 | 5/1999 |

OTHER PUBLICATIONS

Patent Abstracts of Japan, vol. 2, No. 60 (m–018), Apr. 28, 1978 & JP 53 022300.

* cited by examiner

*Primary Examiner*—Denise L. Esquivel
*Assistant Examiner*—Richard L. Leung
(74) *Attorney, Agent, or Firm*—Dilworth & Barrese LLP

(57) ABSTRACT

The following invention relates to an air conditioning system, in particular for aircraft, comprising at least one heat exchanger, arranged in a ram air duct, for cooling compressed air by means of a fluid, and comprising at least a first and a second air cycle machine which at the compressed-air end are connected to the heat exchanger. A particularly compact, reliable, redundant and economical arrangement is achieved in that the heat exchanger comprises at least one first heat exchanger unit and a second heat exchanger unit, of which one each is connected at the compressed-air end to one of the air cycle machines, and in that ram air outlet ducts which are fluidically separate from each other are provided, of which one is connected to the first heat exchanger unit and another is connected to the second heat exchanger unit.

25 Claims, 8 Drawing Sheets

AIR CONDITIONING SYSTEM

BACKGROUND OF THE INVENTION

The present invention relates to an air conditioning system, in particular for aircraft, comprising at least one heat exchanger, arranged in a ram air duct, for cooling compressed air by means of a fluid, and comprising at least a first and a second air cycle machine which at the compressed-air end are connected to the heat exchanger.

Such air conditioning systems are used for air conditioning, i.e. heating and cooling, of the cabin, for cabin pressurisation as well as for fresh air supply. In particular in aircraft construction it is of special importance that the air conditioning system is small and lightweight as possible. Furthermore, it is essential that the above-mentioned functions of the air conditioning system are carried out both during normal operation and during partial failure of the installation (redundancy).

From the state of the art, two different concepts for this are known, as shown below:

FIG. 1 shows a first embodiment according to the state of the art in which two autonomous installations, which in most cases are identical, are used in order to carry out the required functions. The system according to FIG. 1 ensures that even in the case of total failure of one installation, the second installation still meets the minimum requirements. At the inlet end, hot compressed air (e.g. 200° C. and 3 bar) from the engines or from an auxiliary unit, impinges on each of the installations. The volume of air is regulated by the flow control valve FCV. Compressed air first flows through the preliminary or primary heat exchanger PHX wherein it is pre-cooled to approx. 100° C. In the downstream compressor C, the air is further compressed and subsequently cooled to approx. 40° C. by the main or secondary heat exchanger SHX. Subsequently, the air flows through a water separation cycle which comprises the following components: a reheater REH, condenser CON, and water separator WE. The air which has been dehumidified in this way subsequently flows through the turbine T where it is expanded and during this process is cooled down to approx. −30° C. From the turbine outlet, the air flows through the cold end of the condenser CON and subsequently into a mixing chamber or into the cabin.

In each ram air duct, a fan FAN is arranged which is connected to the compressor C and the turbine T by a mutual shaft. These components constitute the so-called 3-wheel machine. The fan FAN is used to convey ambient air or ram air through the heat exchangers SHX and PHX. In order to improve the throughput in the ram air duct during flight, a fan bypass is provided in which a check valve GCKV 1 is arranged.

Temperature control or control of the cooling performance of the installation is via a valve TCV which makes it possible to bypass the compressor, SHX, turbine, and water separation cycle. Moreover, cooling performance can be varied by way of the volume of ram air by means of flaps (RAIA and RAOA) at the ram air duct inlet and/or at the ram air duct outlet.

If an air cycle machine comprising a turbine T, compressor C and fan FAN fails, the train of this partially defective installation can continue to be used during flight for the conveyance of compressed air at reduced cooling performance. In this arrangement, the second installation, which is still intact, is supported as far as throughput and cooling performance are concerned. Cooling of compressed air in the partially defective installation then only takes place through the ram air heat exchangers PHX/SHX, without expansion in the failed turbine T. If a line should fracture, for example the line from the flow control valve FCV to PHX, or if the flow control valve FCV or a ram air flap does not close properly, this causes total failure of the installation concerned. In this case, the remaining second installation fulfils the minimum requirements (cooling, pressurisation, . . . ).

The size of the installation is predominantly determined by the large components SHX/PHX and ram air duct.

Apart from the system architecture comprising a 3-wheel ACM for each installation, as shown as an example in FIG. 1, other installation concepts are of course also possible, such as for example a 4-wheel ACM for each installation, or two ACMs, arranged in series, for each installation, or motorised ACMs or different dehumidification systems.

However, all these systems share a common feature in that at least two installations that are arranged separately are used to fulfil the redundancy requirements.

FIG. 2 shows an alternative air conditioning system known from EP 0 891 279 B1. In this embodiment, there is duplication of components which are associated with a relatively high failure probability and with significant negative effects of failure on the system, for example the air cycle machine ACM and the flow control valve FCV. In contrast, there is only one (shared) ram air heat exchanger SHX, PHX as well as one water separation system comprising the reheater REH, condenser CON and water separator WE.

Based on the arrangement where there is only one each of the large components PHX, SHX and the ram air duct, the design is relatively compact, and consequently, the space requirements are modest when compared to the system architecture shown in FIG. 1 above.

The fundamental cooling process corresponds to that explained in the context of FIG. 1. During normal operation, hot compressed air from the engines or from an auxiliary unit, e.g 200° C. and 3 bar) flows through the two flow control valves FCV 1, FCV 2. Subsequently, the air is brought together and precooled to approx. 100° C. in the shared primary heat exchanger PHX. Approximately half of the PHX outlet air is compressed in compressor 1 (C1) while the other half is compressed in compressor 2 (C2) and after having been brought together is cooled by the ram air to approx. 40° C. in a secondary heat exchanger SHX.

For condensation and water separation, the cooled compressed air is fed through the reheater REH, condenser CON and the water separator WE. Subsequently, the compressed air which has been dehumidified in this way is divided again and about half each is expanded in turbine 1 (T1) and turbine 2 (T2) respectively, and during this process the compressed air is cooled to −30° C. After the cooled air has been brought together, it is fed through the cold end of the condenser CON and finally, through one or two pipes, fed into the mixing chamber or cabin of the aircraft.

In this embodiment too, 3-wheel machines are provided each of which comprises a turbine, a compressor as well as a fan FAN 1, FAN 2. Turbine performance is used for driving the compressors C1, C2 and the fans FAN 1, FAN 2. The fans FAN 1, FAN 2 are arranged in parallel so that when the vehicle is on the ground, each fan conveys approximately half of the ambient air through the shared PHX and SHX. During flight, the flow of ram air through PHX and SHX primarily occurs due to ram pressure. The ram air is fed via a ram air duct to the SHX and the PHX, the latter being arranged downstream of the ram air flow, and downstream of the PHX the air is drawn in through a shared duct by the two fans FAN 1 and FAN 2. This ram air then flows back to the environment via two separate fan outlet ducts.

Temperature control of the cooling air is by means of two temperature control valves TCV 1, TCV 2 and the ram air duct flaps RRIA, RAOA 1 and RAOA 2. The valves TCV 1 and TCV 2 additionally serve to ensure synchronous operation of the two air cycle machines.

Failure of one of the air cycle machines (ACM) is a typical fault in an installation according to FIG. 2. In this case too, certain minimum requirements concerning the volume of air and the cooling performance have to be ensured. In order to carry out these functions even in the case of a fault, two additional valves SOV 1, SOV 2 are integrated in the respective turbine inlet, and two additional check valves CCKV 1 and CCKV 2 are integrated in the respective compressor inlet.

If for example ACM 1 fails due to a seized shaft, the check valve CCKV 1 prevents the compressed air from flowing back from the operating compressor C 2 by way of compressor C 1 to the inlet end of the compressor C 2, which would result in an ineffective circular flow. The valve SOV 1 is closed so that the air compressed by the compressor C 2 is not ineffectively expanded by way of the idle turbine T 1, but instead is only expanded by way of the functioning turbine T 2. Due to failure of one ACM, the remaining, intact ACM should now convey all the air. However, this is not possible as each ACM, for reasons of weight and size is designed to handle only approx. 50% of the total air volume arising during normal operation. Double this air volume cannot be handled. In order to nevertheless provide the required volume of air and achieve the necessary throughput in the system, a partial bypass of the remaining operating ACM 2 is thus necessary by opening the TCV 2.

Furthermore, it is necessary that during on-the-ground operation (no ram pressure) when the air cycle machine (e.g. ACM 1) has failed, the associated ram air duct outlet flap RAOA 1 be closed, because otherwise the operating fan FAN 2 would draw in the air from the other outlet duct rather than through the ram air heat exchanger. For this reason, the system shown in FIG. 2 requires at least two controllable ram air outlet flaps.

Apart from the architecture shown as an example in FIG. 2, comprising two 3-wheel ACMs for each installation or for each heat exchanger shared in use, other installation concepts are also possible and known, such as for example two 4-wheel ACMs, arranged in parallel, for each installation, or two serially arranged ACMs for each installation, or motorised ACMs, or different dehumidifying systems.

Irrespective of the above, a common factor of all the known systems is the use of at least two air cycle machines for each installation and for each shared heat exchanger so as to meet the redundancy requirements.

The systems shown in FIG. 1 and FIG. 2 are associated with the following disadvantages:

The system according to FIG. 1 has the disadvantage of increased space requirements which results in a reduction of useable space for other aircraft systems or freight. Moreover, two ram air ducts and thus two ram air inlets and ram air outlets including flaps are necessary in the fuselage, with corresponding space requirements and weight.

The embodiment according to FIG. 2 with a single installation where some of the components are duplicated has the following disadvantages. When compared to the embodiment according to FIG. 1, the following additional components are required: two valves (SOV 1 and SOV 2) as well as two check valves (CCKV 1 and CCKV 2). In particular, the reliability of valves is relatively low, consequently they reduce system reliability. System complexity and costs are increased. Failure of an SOV or of a CCKV in closed position leads to complete failure of the respective air cycle machine.

Furthermore, the system according to FIG. 2 requires two ram air outlet ducts, each with a ram air outlet flap in the fuselage, with the associated disadvantages of a large space requirement as well as heavy weight.

Ensuring synchronous operation of the two air cycle machines requires additional control and regulating effort. Failure of an air cycle machine necessitates quick operation of the valves (for example SOVs) so as to ensure proper operation as well as ensuring the functions of pressurisation, ventilation and cooling. Certain components of the system according to FIG. 2 are only provided singly, i.e. there is no duplication; this applies for example to the line from FCV 1 and FCV 2 to the PHX, and/or to the heat exchanger and/or to the water separation system. Failure of just one of these components, such as for example a line fracture, results in total failure of the entire air conditioning system.

If one air cycle machine fails, the cooling performance and throughput in the system is considerably reduced in comparison to those of the embodiment according to FIG. 1. If for example the air cycle machine ACM 1 fails (shaft seizure),the check valve CCKV 1 prevents the compressed air of the operating compressor C 2 from flowing by way of compressor C 1 (ineffective circular flow). SOV 1 is closed so that the air compressed by the compressor C 2 is not ineffectively expanded by way of the idle turbine T 1, but instead is only expanded by way of the functioning turbine T 2. Due to failure of an ACM, the remaining ACM should now convey all the air. However, this is not possible as each ACM is designed to handle only approx. 50% of the total air volume arising (normal operation). An ACM is thus not in a position to handle double the volume of air. As a result of this, the throughput in, and cooling performance of, the installation in the case of a fault is considerably reduced.

Even by overdimensioning the ACMs, i.e. by designing them to handle e.g. 70% instead of 50% of the total throughput, this disadvantage can only be compensated for inadequately because the space requirements and the weight of the ACMs are increased as a result. Essentially, the weight of a component is a function of the throughput.

SUMMARY OF THE INVENTION

It is thus the object of the present invention to improve an air conditioning system of the type mentioned in the introduction such that it comprises a small number of components, a compact design, a high degree of reliability, good redundancy, as well as a high cooling performance if one air cycle machine fails during flight.

This object met by an air conditioning system with the characteristics set forth herein. Accordingly, the heat exchanger comprises at least one first heat exchanger unit (SHX 1/PHX 1) and second heat exchanger unit (SHX 2/PHX 2), of which one each is connected at the compressed-air end to one of the air cycle machines. Furthermore, ram air outlet ducts which are fluidically separate from each other are provided, of which one is connected to the first heat exchanger unit and another is connected to the second heat exchanger unit. In contrast to the embodiment according to FIG. 2, heat exchanger units are duplicated. In each case, one of the air cycle machines is connected at the compressed air end to one of the heat exchanger units. Consequently, no valves are needed at the compressor inlet (CCKV in FIG. 2). As a result of this, failure of an air cycle machine purely due to failure of these valves is impossible. When compared to the embodiment according to FIG. 2, there is a further advantage in that during failure of an air cycle machine during flight, a lesser reduction in cooling performance and system throughput occurs. This is possible because, due to the separate arrangement of guiding the compressed air, that part of the installation wherein the air cycle machine has failed, can be used for conveying compressed air and for heat exchanger cooling. A further advantage results from the fact that it is not necessary to have two ram air duct outlet flaps; this results in corresponding advantages relating to cost, space and weight. By fluidically separating the two ram air outlet ducts from each other, a situation is achieved where the functioning fan always draws in air through the heat exchangers, rather than from the other outlet duct.

The fluid can be ambient air or ram air.

A further embodiment of the present invention provides for the first and second heat exchanger unit to form a mechanical unit. It is imaginable that the heat exchanger units are either directly interconnected or not directly interconnected but instead are for example separated by a gap.

In a further embodiment of the present invention, each air cycle machine comprises at least one turbine and at least one compressor and/or one fan. For example, the air cycle machines can be designed as 3-wheel machines which comprise a turbine, a compressor and a fan.

Preferably, each of the ram air outlet ducts comprises a fan for conveying ambient air or ram air through the heat exchanger.

In a preferred embodiment of the present invention, each of the two separate, i.e. fluidically separate, ram air outlet ducts is further divided into a fan outlet duct and a fan bypass duct. The ram air outlet ducts can either be mechanically divided (separate) or mechanically shared (parallel). The bypass duct is used to increase the throughput in the ram air duct during flight.

In each of the bypass ducts, a check valve and/or a shared or two separate ram air duct outlet flaps for closing off the bypass ducts of the ram air outlet ducts can be provided. Thus the outlet of the two bypass ducts can be closed by means of a shared flap or by means of two flaps of which one each is arranged for each bypass duct. In the closed state the flap or flaps close only the bypass ducts. In contrast to the state of the art according to FIG. 1 and FIG. 2, the present system can be operated with only one ram air duct outlet flap. This results in advantages relating to cost, space and weight.

A further embodiment of the present invention provides for the heat exchanger units to be fluidically separate from each other at the ram air end and that ambient air or ram air from a shared ram air duct to impinge on said heat exchanger units. Thus, there is a separate flow through the heat exchangers at the ram air end, with a shared ram air inlet duct and separate ram air outlet ducts, which are preferably arranged in parallel, being used.

According to the invention, a fluidically shared ram air inlet duct and fluidically separate ram air outlet ducts can be provided, with one of the latter being connected to the first heat exchanger unit and one to the second heat exchanger unit.

A further embodiment of the present invention provides for a ram air duct inlet flap to be provided.

In a further embodiment of the present invention the heat exchanger comprises a primary heat exchanger and a secondary heat exchanger. The compressed air is first cooled in the primary heat exchanger before being further compressed in the compressor and subsequently being fed through the secondary heat exchanger, wherein it is subjected to further cooling.

A particularly compact design results from the primary and secondary heat exchangers forming a mechanical unit. It can be provided for the primary and secondary heat exchangers to be directly adjoining or alternatively to be spaced apart, e.g. by a gap.

At the ram air end, the primary and secondary heat exchangers can be arranged in series, in parallel, or in such a way that ambient air or ram air flows through part of the primary heat exchanger in parallel, while it flows in series to part of the secondary heat exchanger. In the first case, at the ram air end, the primary heat exchanger is arranged downstream of the secondary heat exchanger; while in the second case it is arranged in parallel, and in the third case it is arranged partially in series and partially parallel. The latter has the advantage in that the primary heat exchanger is at least partly, preferably at its outlet region at the compressed-air end, impinged with cool ambient air or ram air.

A further embodiment of the present invention provides for the heat exchanger units to comprise their own compressed air supply. A flow control valve is arranged in each of the compressed air supply lines.

Furthermore, it can be provided for two or more air cycle machines to be connected in series with, or parallel to, a heat exchanger unit (e.g. SHX 1/PHX 1). Moreover, it can be provided that there are more than two heat exchanger units, each of which, at the compressed-air end, are connected with one or several air cycle machines.

A preferred embodiment of the present invention provides for a water separation system to be connected to each of the air cycle machines. Said system is used to separate out a large part of the water contained in the compressed air.

Various designs of water separation systems can be used.

One possible embodiment comprises a reheater, a condenser and a water separator. Compressed air first flows through the reheater where it is cooled. Subsequently, in the condenser, condensation of the moisture contained in the compressed air takes place. Separation of the water from the compressed air takes place in the water separator. Subsequently, the air flows through the reheater where it is heated and where droplets that have not been eliminated are evaporated before the air is expanded and cooled in the turbine. The expanded turbine air is fed through the cold end of the condenser and is subsequently fed to the mixing chamber and then to the cabin.

A further embodiment of the present invention provides for the water separation systems, which can be designed as water separation cycles, to be fluidically separate from each other and to form a mechanical unit, or to be arranged so as to be mechanically separate. The above mentioned components which are necessary for dehumidification are thus subjected to a separate air flow, thus providing separate heat transfer for the respective air cycle machine; however, said components are for example interconnected in a mechanical unit which results in a correspondingly compact design. It is also possible, that the dehumidification systems are designed so as to be mechanically separate.

A further embodiment of the present invention provides for the cooled air to be fed to the mixing chamber or to the cabin by way of one or several supply lines. For example there can be two supply lines.

BRIEF DESCRIPTION OF THE DRAWINGS

Further details and advantages of the present invention are explained in more detail by means of one embodiment shown in the drawing. The following are shown.

DESCRIPTION OF PREFERRED EMBODIMENTS

Figure 3:
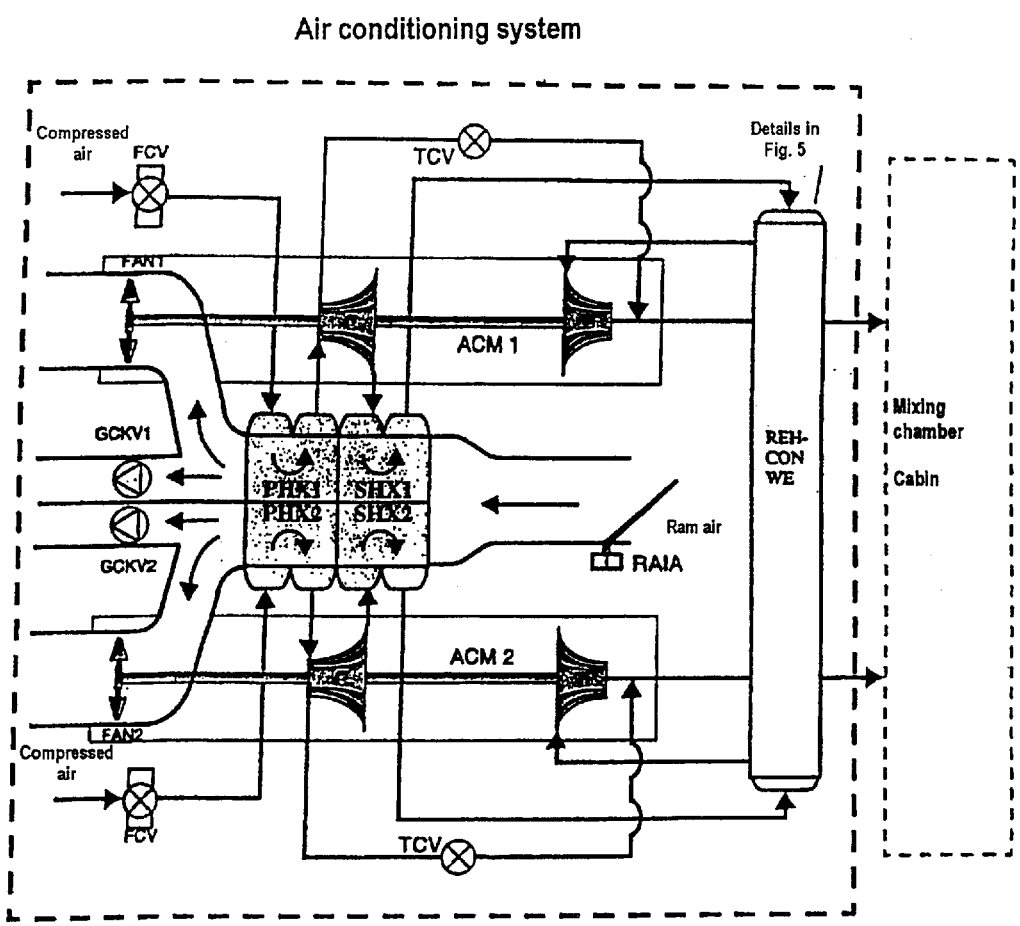
FIG. 3: A view of an air conditioning system according to the present invention, comprising a primary and a secondary heat exchanger, with two heat exchanger units each, as well as with a water separation unit shared by both ACMs.

FIG. 3 is a diagrammatic view of one possible embodiment of the air conditioning system according to the present invention. A primary heat exchanger and a secondary heat exchanger are arranged in the ram air duct. Both heat exchangers comprise heat exchanger units PHX 1 and PHX 2, and SHX 1 and SHX 2 respectively, which units are separate from each other from the point of view of fluidics and heat technology. Units PHX 1 and PHX 2 as well as SHX 1 and SHX 2 can form a mechanical unit and can also be interconnected which results in a particularly compact design. It can be provided for the heat exchanger units PHX 1 and SHX 1 as well as PHX 2 and SHX 2 to be designed so as to be separated by a gap.

As shown in FIG. 3, a shared ram air inlet duct is provided for both heat exchanger units SHX 1/PHX 1 and SHX 2/PHX 2. The ram air flows through the heat exchanger unit SHX 1 and subsequently through the unit PHX 1 and, separated by it, through the heat exchanger units SHX 2 and PHX 2.

As is further shown in FIG. 3, two separate ram air outlet ducts are provided, one of which is connected to the heat exchanger unit PHX 1 and the other to PHX 2. Each of the ram air outlet ducts is separate and comprises a bypass duct, comprising a check valve GCKV 1 or GCKV 2. In the other part of the ram air outlet ducts, a fan FAN 1, or FAN 2 is arranged. Each of these fans together with the associated compressor C and the associated turbine T form a 3-wheel machine.

FIG. 3 also shows the water separation system REH-CON WE. It is used to separate water from the compressed air prior to its expansion in the turbine T. Details concerning the water separation system REH-CON WE are explained in the context of FIG. 5.

The function of the air conditioning system shown in FIG. 3 is as follows: the primary heat exchanger units PHX 1, PHX 2 are supplied separately with compressed air. A flow control valve FCV is arranged at each inlet end. After the compressed air has passed through the fluidically separate heat exchanger units PHX 1, PHX 2 and after cooling of the compressed air which takes place therein, the compressed air is fed through a respective compressor C, where it is further compressed. Subsequently, the air which was compressed in this way is fed through the respective secondary heat exchanger unit SHX 1 or SHX 2 which is separate from the point of view of fluidics and heat technology. The air then reaches the water separation system REH-CON WE. In this system, which also forms a mechanical unit but which comprises two water separation systems which are separate from the point of view of fluidics and heat technology, water separation and thus dehumidification of the air prior to it being fed to the respective turbines T takes place. The air is expanded and cooled in the turbines T. The cooled air is used for cooling the condenser of the water separation unit REH-CON WE. Subsequently the air is fed to the mixing chamber of the cabin.

Ambient air or ram air is used for cooling the primary and secondary heat exchanger units PHX 1, PHX 2, and SHX 1, SHX 2. The air flows through the shared ram air inlet duct, first into the heat exchanger units SHX 1, SHX 2 of the secondary heat exchanger. The volume of ram air is controlled by the ram air inlet flap RAIA. The secondary heat exchanger units SHX 1 and SHX 2 are separate from each other, not only at the compressed-air end but also at the ram air end. The same applies analogously to the primary heat exchanger units PHX 1 and PHX 2. Accordingly, the ram air flows separately through the serially arranged units SHX 1 and PHX 1 or SHX 2 and PHX 2. The air streams issuing from the heat exchanger units PHX 1 and PHX 2 enter the separate ram air ducts and pass through the fans FAN 1 or FAN 2 or flow to the surroundings through the bypass ducts.

The system also comprises bypass lines which can be closed off by means of a temperature control valve TCV; said bypass lines extending from the inlet end of the compressor C to the outlet end of the turbine T.

Apart from the architecture comprising 3-wheel ACMs and a high-pressure water separation system, as shown by way of example in FIG. 3, the invention can also be realised using other designs of air cycle machines, comprising at least one turbine and at least one fan and/or at least one compressor. Furthermore, the invention is also possible with other designs of water separation systems.

Figure 8:
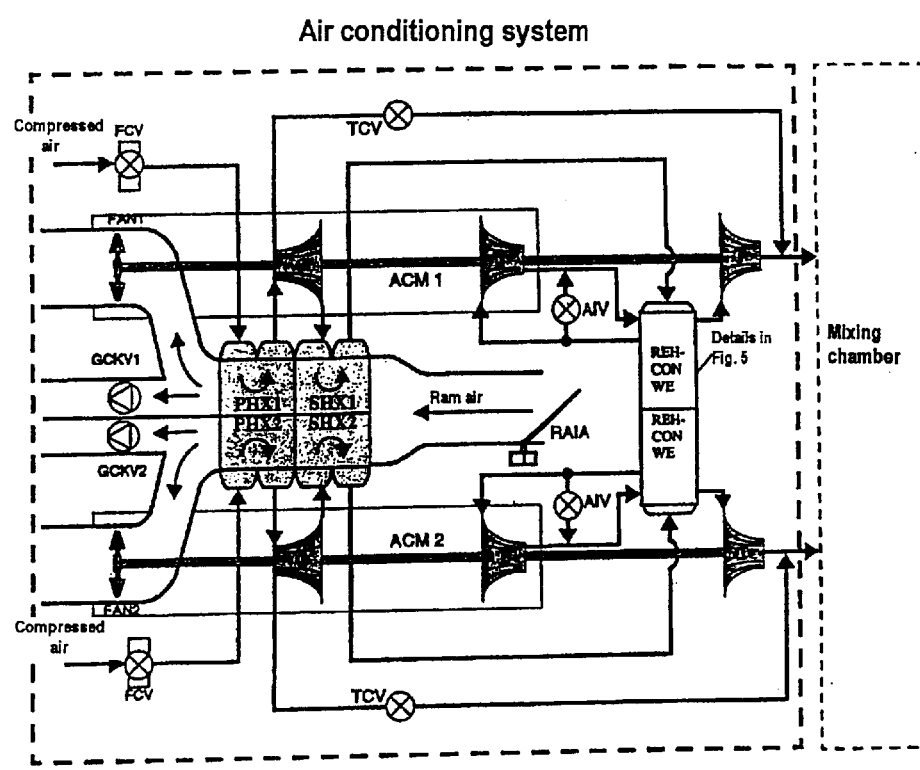
FIG. 8: a view of an air conditioning system according to the present invention, comprising a primary heat exchanger and a secondary heat exchanger, each comprising two heat exchanger units, as well as comprising ACMs which are designed as 4-wheel machines.

A further embodiment comprising a 4-wheel ACM is shown in FIG. 8.

Figure 4:
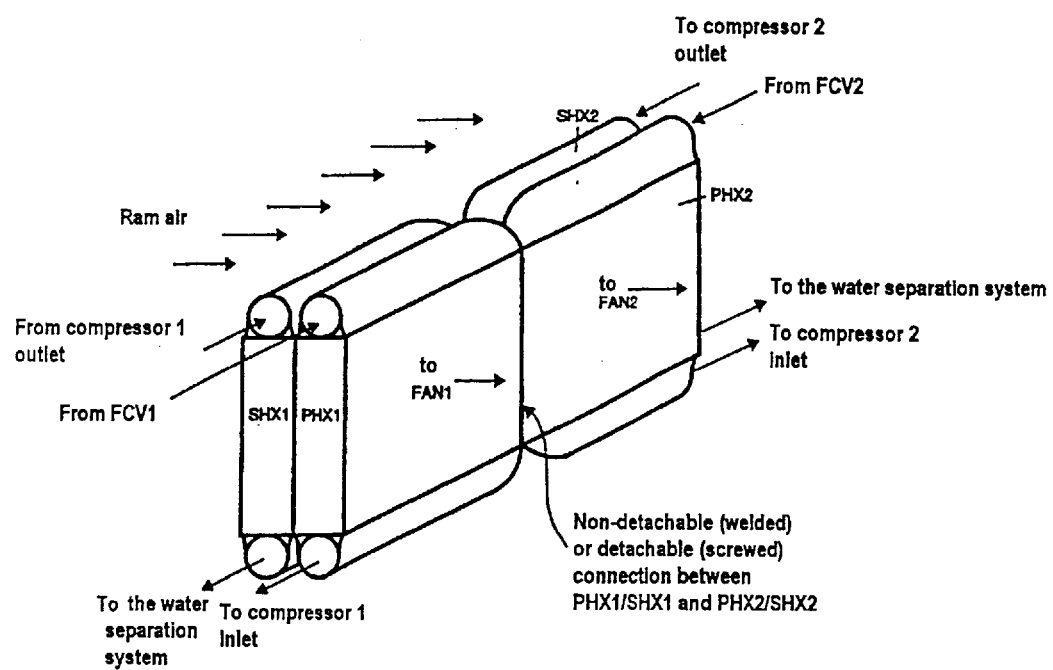
FIG. 4: a view of a ram air heat exchanger, comprising a primary and a secondary heat exchanger, with separate through-flow.

FIG. 4 is a perspective view of the ram air heat exchanger which forms one mechanical unit and which comprises four heat exchanger units. As has already been explained in the context of FIG. 3, the ram air heat exchanger comprises a shared ram air inlet. The ram air subsequently flows in separate streams through the serially arranged heat exchanger units SHX 1, PHX 1 or SHX 2 and PHX 2. Subsequently, the ram air reaches the fans FAN 1 and FAN 2. At the compressed-air end, at first compressed air impinges on the heat exchanger units PHX 1 and, parallel to it, PHX 2. The compressed air flows via the respective flow control valves FCV 1 and FCV 2 to the respective heat exchanger units PHX 1, PHX 2. The air is cooled in the heat exchanger units PHX 1 and PHX 2 and reaches the respective compressor C. The air compressed therein flows to the inlet of the secondary heat exchanger units SHX 1 and SHX 2, is further cooled in said units, and finally flows to the water separation system.

The junction between PHX 1/SHX 1, and PHX 2/SHX 2 can be designed so as to be detachable, for example screwed, or non-detachable, for example welded.

Figure 5:
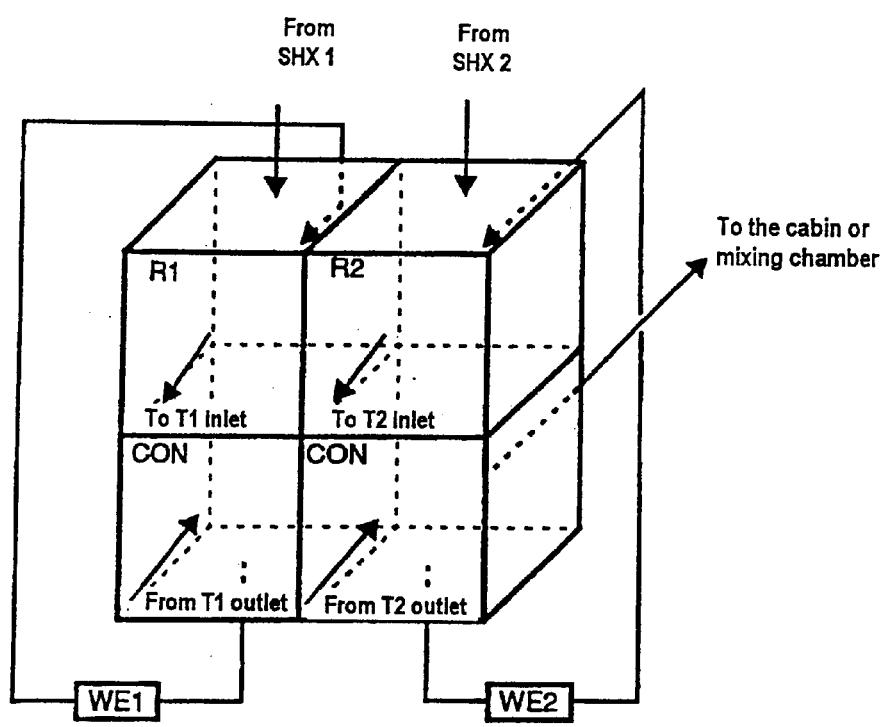
FIG. 5: a diagrammatic view of two water separation cycles which form one mechanical unit, comprising a reheater, a condenser and a water separator with separate through-flow.

FIG. 5 is a diagrammatic view of the water separation system REH-CON WE shown in FIG. 3. It comprises two heat exchanger cycles which are separate from each other from the point of view of fluidics and heat technology, said heat exchanger cycles constituting a mechanical unit. From SHX 1 and parallel to it, from SHX 2, the air to be dehumidified first flows into the reheaters R 1 and R 2. Subsequently, the air flows through the condensers CON. Moisture is separated out in the downstream water separators WE 1 and WE 2. The air which has been dehumidified in this way subsequently flows through the reheaters R 1 and R 2, wherein it is slightly heated so that any water droplets that may still be present are evaporated. From the reheaters, the air reaches the respective inlets of the turbines T 1 and T 2. The condensers CON are connected to the turbine outlets. The cold air which has been expanded in the turbines T 1, T 2, is fed through the cold end of the condensers CON, thus causing condensation of the moisture at the warm end of the condenser.

After flowing through the condensers CON, the air is fed to the cabin or to the mixing chamber.

The air conditioning system according to FIGS. 3 to 5 comprises the advantages that all components are duplicated. Compared to the embodiment according to FIG. 2 from the state of the art, failure of a component can thus not lead to total failure of the entire system. In particular, unlike the case of FIG. 2, no valves are provided at the compressor inlet CCKV or at the turbine inlet SOV. Failure of an air cycle machine due to failure of one of these valves is thus impossible.

Figure 1:
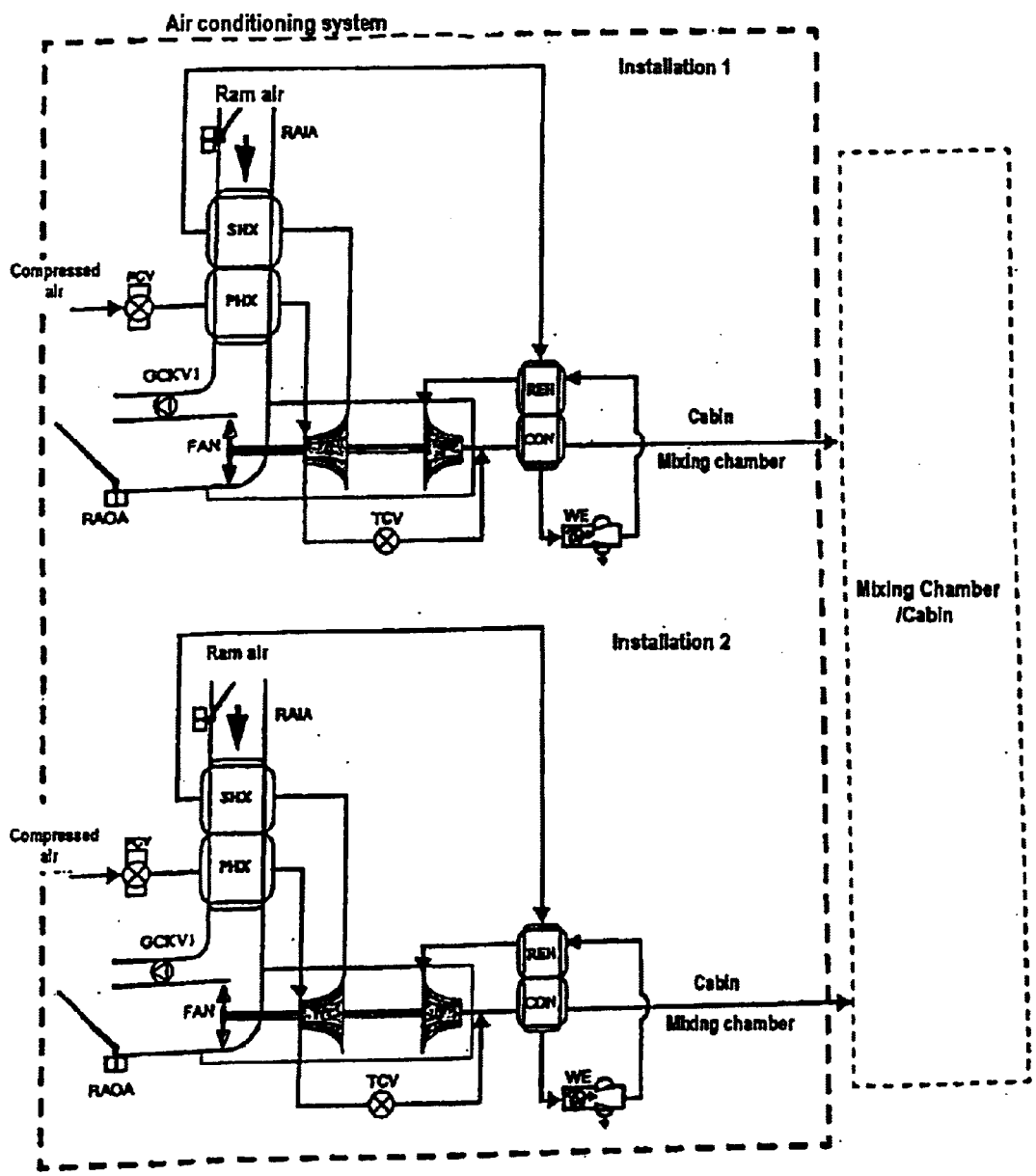
FIGS. 1, 2: Air conditioning systems according to the state of the art.

When compared to the embodiment according to FIG. 1, there is a reduced space requirement due to the compact arrangement of the heat exchangers and the ram air duct. Compared to the embodiment in FIG. 2 there is also a reduced space requirement due to the reduction in the number of components. This applies in particular to the lower number of ram air flaps as well as control valves and check valves.

Figure 2:
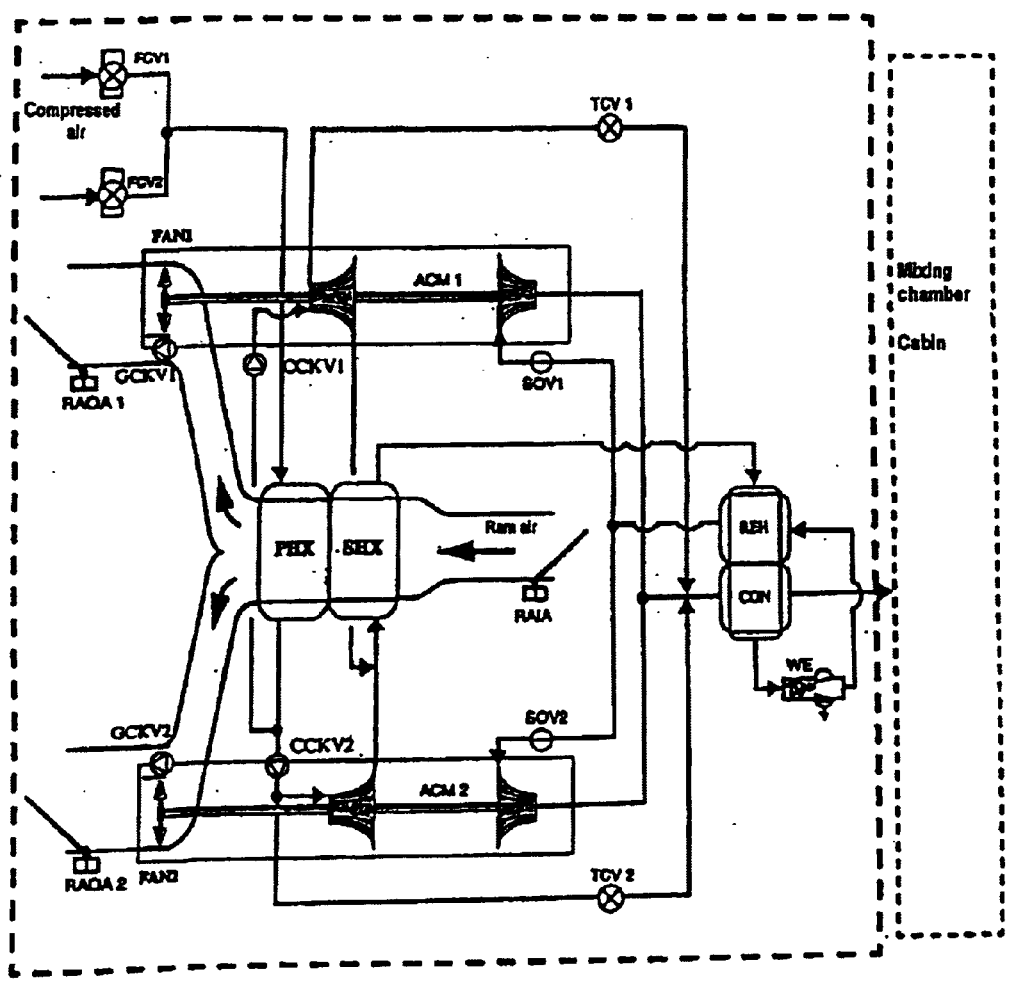

When compared to the embodiment according to FIG. 2, in the system according to the invention, due to fluidic separation of the two air cycle machines, compressed air can continue to be cooled by means of the ram air heat exchangers even if one air cycle machine fails. Furthermore, a single fault, e.g. a fractured line, cannot result in total failure of the entire system Furthermore, compared to the state of the art according to FIG. 1 and FIG. 2, there is the possibility of using only one ram air duct outlet flap. This results in corresponding advantages relating to cost, space and weight.

Figure 6:
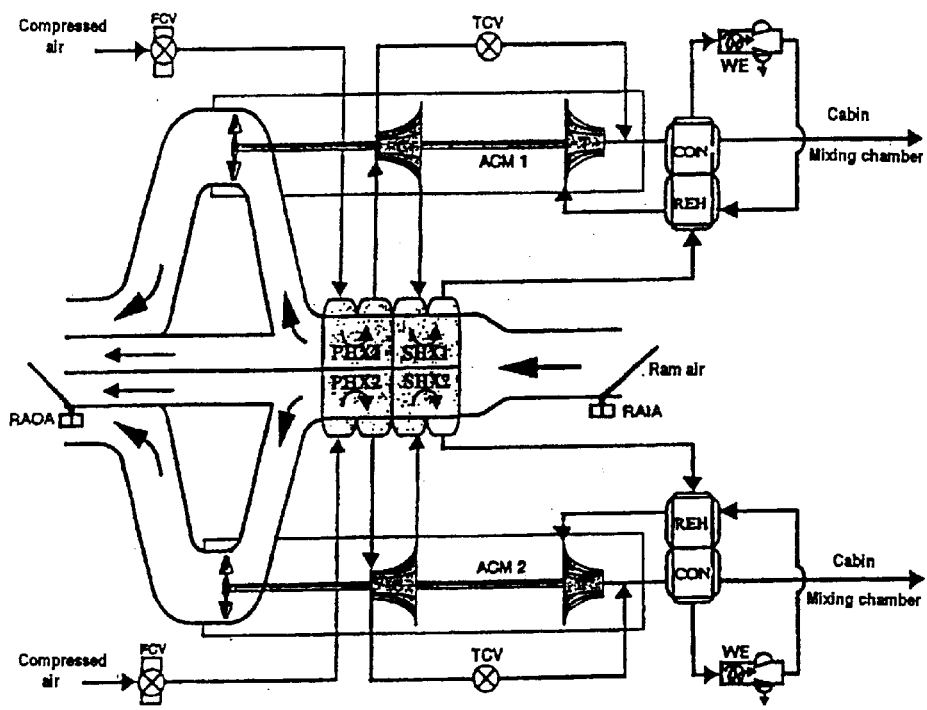
FIG. 6: a view of an air conditioning system according to the invention, comprising a primary heat exchanger and a secondary heat exchanger, each comprising two heat exchanger units as well as comprising mechanically separate water separation cycles and a shared ram air outlet duct for both fan bypass ducts.

FIG. 6 shows an air conditioning system in which all components correspond to those of FIG. 3, except for the water separation system and the ram air duct outlet flap RAOA. However, unlike the arrangement in the air conditioning system according to FIG. 3, the arrangement in FIG. 6 provides for two mechanically separate water separation cycles. By means of one outlet line each, they are connected to the cabin or to the mixing chamber.

There is a further difference compared to the arrangement shown in FIG. 3, in that the fan bypass ducts at the ram air outlet end can be closed off by means of a ram air duct outlet flap RAOA.

The ram air duct inlet flaps RAIA can be operated by one motor, or, for reasons of redundancy, by two motors.

The table below shows a further advantage of the air conditioning system according to the invention. The table compares the number of components used for each air conditioning system. The number of components of the air conditioning system according to the invention, as shown in FIG. 6, is compared with the respective numbers used in the embodiments according to FIG. 1 and FIG. 2 from the state of the art. The reduced number of components not only results in reduced space requirements (ram air flaps, heat exchanger units) but also in a reduction in cost due to not having to use relatively expensive components such as valves and ram air flaps.

| Component designation | Number of components for each air conditioning system | | |
|---|---|---|---|
| | State of the art Design FIG. 1 | State of the art Design FIG. 2 | Present invention FIG. 6 |
| Control valves and check valves | 6 | 10 | 4 |
| Ram air flaps | 4 | 3 | 2 |
| Heat exchanger | 4 | 2 | 2 |
| Water separator | 2 | 1 | 2 |

Figure 7:
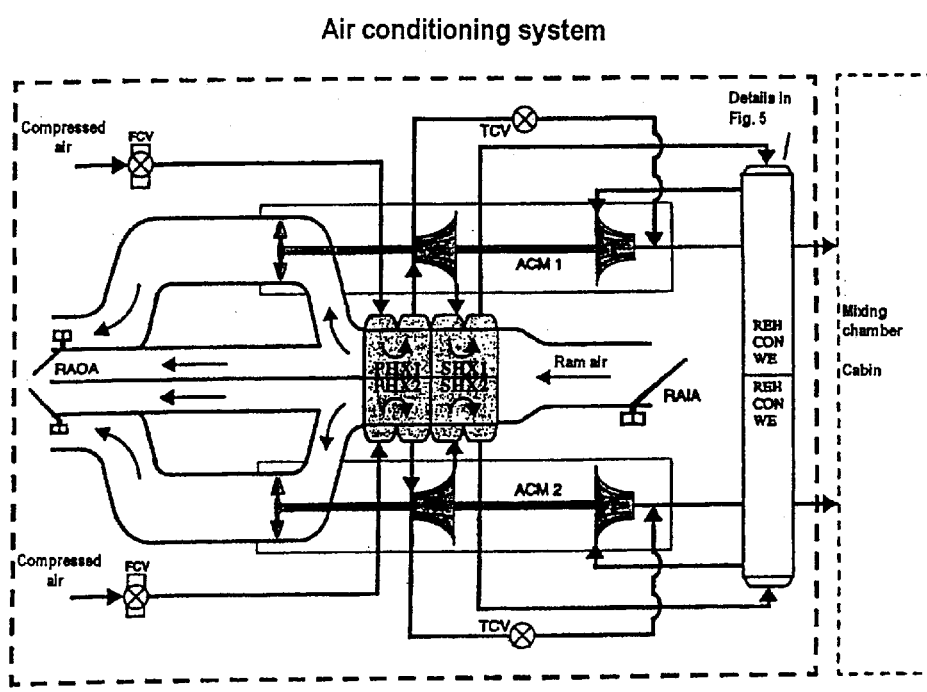
FIG. 7: a diagrammatic view of an air conditioning system according to FIG. 3, wherein each fan bypass duct can be closed off by its own ram air outlet flap.

FIG. 7 shows a diagrammatic view of an air conditioning system according to FIG. 3, wherein each of the fan bypass ducts can be closed off with its own ram air outlet flap RAOA.

FIG. 8 shows an air conditioning system in which the ACMs are 4-wheel machines. In this embodiment, the air, having left the water separation system, is not fed directly into the mixing chamber but instead, as shown in FIG. 8, is expanded in a further turbine stage T before being fed into the mixing chamber.

What is claimed is:

1. An air conditioning system, comprising:
   at least one heat exchanger, arranged in a ram air duct, for cooling compressed air by a fluid, and comprising at least a first (ACM 1) and a second (ACM 2) air cycle machine which at the compressed-air end are connected to the heat exchanger,
   wherein
   the heat exchanger comprises at least one first heat exchanger unit (PHX 1, SHX 1) and second heat exchanger unit (PHX 2, SHX 2), of which one each is connected at the compressed-air end to one of the air cycle machines (ACM 1, ACM 2) separately from the other heat exchanger such that the first (PHX 1, SHX 1) and second (PHX 2, SHX 2) heat exchanger units are separate from each other at the compressed-air end, and
   ram air outlet ducts which are fluidically separate from each other are provided, of which one is connected to the first heat exchanger unit (PHX 1, SHX 1) and another is connected to the second heat exchanger unit (PHX 2, SHX 2).

2. The air conditioning system according to claim 1, wherein the fluid is ambient air or ram air.

3. The air conditioning system according to claim 2, wherein the first heat exchanger unit (PHX 1, SHX 1) and second heat exchanger unit (PHX 2, SHX 2) form a mechanical unit.

4. The air conditioning system according to claim 2, wherein each air cycle machine (ACM 1, ACM 2) comprises at least one of a turbine, compressor and fan.

5. The air conditioning system according to claim 1, wherein the first heat exchanger unit (PHX 1, SHX 1) and second heat exchanger unit (PHX 2, SHX 2) form a mechanical unit.

6. The air conditioning system according to claim 1, wherein each air cycle machine (ACM 1, ACM 2) comprises at least one of a turbine compressor and fan.

7. The air conditioning system according to claim 1, wherein in each of the ram air ducts, a fan (FAN 1, FAN 2) for conveying ambient air or ram air through the heat exchanger is provided.

8. The air conditioning system according to claim 1, wherein the heat exchanger units (PHX 1, SHX 1, PHX 2, SHX 2) are fluidically separate from each other at the ram air end and ambient air or ram air from a shared ram air duct impinges on said heat exchanger units.

9. The air conditioning system according to claim 1, wherein a ram air duct inlet flap (RAIA) is provided.

10. The air conditioning system according to claim 1, wherein the heat exchanger comprises a primary heat exchanger and a secondary heat exchanger.

11. The air conditioning system according to claim 10, wherein the primary and secondary heat exchangers (PHX 1, SHX 1; PHX 2, SHX 2) form a mechanical unit.

12. The air conditioning system according to claim 1, wherein the heat exchanger units (PHX 1, SHX 1; PHX 2, SHX 2) comprise their own compressed air supply.

13. The air conditioning system according to claim 1, wherein two or more air cycle machines (ACM 1, ACM 2) are connected in series with, or parallel to, a heat exchanger unit (PHX 1, SHX 1; PHX 2, SHX 2).

14. The air conditioning system according to claim 1, wherein a water separation system is connected to each of the air cycle machines (ACM 1, ACM 2).

15. The air conditioning system according to claim 14, wherein the water separation system comprises a reheater (REH), a condenser (con) and a water separator (WE).

16. The air conditioning system according to claim 14, wherein the water separation systems, are fluidically separate from each other and form a mechanical unit, or are arranged to be mechanically separate.

17. The air conditioning system according to claim 16, wherein said water separation systems constitute water separation cycles.

18. The air conditioning system according to claim 1, wherein said first (PHX 1, SHX 1) and second (PHX 2, SHX 2) heat exchanger units are separate from each other at both the compressed-air and ram air ends.

19. The air conditioning system according to claim 1, structured and arranged for incorporation into aircraft.

20. The air conditioning system according to claim 19, wherein the cooled air is fed to a mixing chamber or cabin by way of one or several supply lines.

21. An air conditioning system, comprising at least one heat exchanger, arranged in a ram air duct, for cooling compressed air by a fluid, and comprising:

at least a first (ACM 1) and a second (ACM 2) air cycle machine which at the compressed-air end are connected to the heat exchanger, wherein the heat exchanger comprises at least one first heat exchanger unit (PHX 1, SHX 1) and second heat exchanger unit (PHX 2, SHX 2), of which one each is connected at the compressed-air end to one of the air cycle machines (ACM 1, ACM 2), ram air outlet ducts which are fluidically separate from each other are provided, of which one is connected to the first heat exchanger unit (PHX 1, SHX 1) and another is connected to the second heat exchanger unit (PHX 2, SHX 2), and each of the separate ram air outlet ducts is further divided into a fan outlet duct and a fan bypass duct.

22. The air conditioning system according to claim 21, wherein in each of the bypass ducts, a check valve (GCKV 1, GCKV 2) is provided.

23. The air conditioning system according to claim 22, wherein a shared ram air duct outlet flap or two separate ram air duct out flaps (RAOA) for closing off the bypass ducts of the ram air outlet ducts is/are provided.

24. The air conditioning system according to claim 21, wherein a shared ram air duct outlet flap or two separate ram air duct outlet flaps (RAOA) for closing off the bypass ducts of the ram air outlet ducts is/are provided.

25. An air conditioning system, comprising at least one heat exchanger, arranged in a ram air duct, for cooling compressed air by a fluid, and comprising:

at least a first (ACM 1) and a second (ACM 2) air cycle machine which at the compressed-air end are connected to the heat exchanger, wherein the heat exchanger comprises at least one first heat exchanger unit (PHX 1, SHX 2) and second heat exchanger unit (PHX 2, SHX 2), of which one each is connected at the compressed-air end to one of the air cycle machines (ACM 1, ACM 2), ram air outlet ducts which are fluidically separate from each other are provided, of which one is connected to the first heat exchanger unit (PHX 1, SHX 1) and another is connected to the second heat exchanger unit (PHX 2, SHX 2), the heat exchanger comprises a primary heat exchanger and a secondary heat exchanger, and at the ram air end, the primary and secondary heat exchangers are arranged in series, in parallel or in such a way that ambient air or ram air flows through part of the primary heat exchanger in parallel, while it flows in series to part of the secondary heat exchanger.

* * * * *